UNITED STATES PATENT OFFICE.

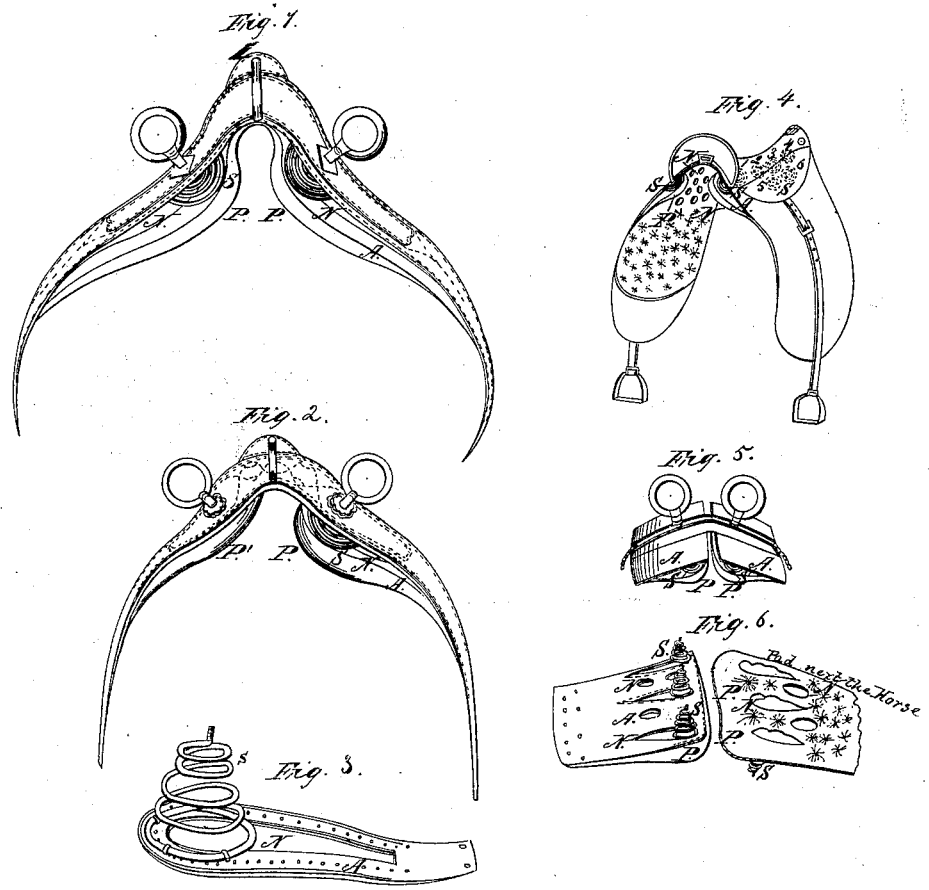

JAMES P. McLEAN, OF BROOKLYN, NEW YORK.

IMPROVED VENTILATING-PAD.

Specification forming part of Letters Patent No. 50,147, dated September 26, 1865.

*To all whom it may concern:*

Be it known that I, JAMES P. MCLEAN, of the city of Brooklyn, in the county of Kings and State of New York, have made a new and useful Improvement in the Mode of Constructing Spring-Pads for Harness and Riding-Saddles for Horses; and I hereby declare the following to be a full, clear, and exact description thereof, reference being had to the accompanying drawings, which are lettered to correspond with and form a part of this specification.

In order that the public may fully understand my invention, and those who are skilled in the mechanic arts be enabled to construct the same, I will describe it, as follows:

Figure 1 is a perspective drawing of a light harness-tree having my improved spring-pads P P attached.

Fig. 2 is a similar drawing to Fig. 1, having my improved spring-pad P on one side only, in order to illustrate more clearly its superiority over the ordinary or common pad, P'.

Fig. 3 is a perspective view of the metallic spring-plate A, provided with an opening, N, and perforated, in order to secure the soft pad or cushion (next the horse) in its place. Letter S is a cone-shaped spiral or volute spring, the base of which is secured to the metallic spring-plate A. The top or small end, c, of spring S is fastened to the under side of the tree by means of a screw-nut in the terret, or otherwise. The small or tempered end of the flat spring A is secured to the under side of the tree (or the skirt thereof) by means of rivets or any other suitable device.

Fig. 4 is a perspective drawing of a riding-saddle provided with spring-pads P P and spring supporting-plates A A, fashioned of metal, or any other material, into shapes corresponding with the saddle flaps or wings of the tree to which they (the plates) are secured as aforesaid at the lower end, while the ends next the seat are securely fastened to the base of the volute or cone-shaped spiral springs S S S S, the small or top ends of which are fastened to the lower side of the tree at Figs. 1, 2, 3, 4, 5, and 6.

Fig. 5 is a perspective drawing of a harness tree and pads for a cart, dray, or heavy-draft harness, with my ventilating spring-pads P P attached thereto. The spiral or volute springs for such pads should be made of heavy steel or tempered brass wire, (size No. 9 or 12.) These pads are attached to the wings of the tree in a similar manner to those already shown at Figs. 1 2 4. The springs S S S S are arranged on each side of the back of the horse, as shown at Fig. 6, which also shows the open spring-plate A next the tree, with openings N N N N. The pad P P on the right-hand side of Fig. 6 represents the cushion next the horse, which is also provided with open spaces N N N of any suitable shape for ventilative purposes.

I am aware that various kinds of springs have been applied to saddle-trees for the purpose of relieving the horse from the concussion caused by the action of the vehicle or otherwise; but I am not aware of any application of a spring or springs forming a part of a harness or riding saddle in such a manner that a triple beneficial result is produced—first, preventing the shock; secondly, ventilating the back by means of openings N N N N, and, thirdly, relieving the rider and horse from the constant jolting of a hard-trotting beast.

The above are the advantages of my ventilating spring-pads over those that are in common use. Yet I do not confine myself to the use of a metallic-spring supporting-plate, A, from the fact that the volute springs S S S S may be supported upon leather or other material provided with ventilators or openings N N N N, in which case the whole elasticity of the pad would depend upon the volute springs S S S S; but where a metal plate, A, tempered at the lower end next the skirt of the tree is employed, the pads P P are more flexible and less strain upon the springs S S S. Neither do I confine myself to any specific shape or form of pads P P, but shape my plates A A A to suit the different saddle or harness trees.

The spiral or volute springs may be dispensed with, if necessary, and yet have a flexible ventilating-pad, by simply employing a stiff steel plate, A, with openings N N N for ventilating the back, thereby preventing the galling, which is more or less the case with the common or ordinary harness-pads; but where comfort and ease combined for the horse and rider are sought after, the entire arrangement, as set forth and shown in the drawings, is preferable. Therefore,

What I claim as novel and useful, and what I wish to secure by Letters Patent of the United States, is—

1. The spring-plate A, having an opening or openings, N N N N, either separate or in combination with the volute or cone-shaped spiral spring or springs S S S S, operating in the manner and for the purpose set forth.

2. The volute or cone-shaped spiral spring or springs S S S S, either separate or in combination with the spring supporting-surface A A A, with openings N N N N, as applied to a riding-saddle or harness tree for ventilative and other purposes, substantially in the manner and for the purposes set forth and shown in the drawings.

In testimony whereof I hereunto subscribe my name in the presence of two witnesses.

JAMES P. McLEAN.

Witnesses:
  WILLIAM MACKEY,
  ANDREW MACKEY.